UNITED STATES PATENT OFFICE.

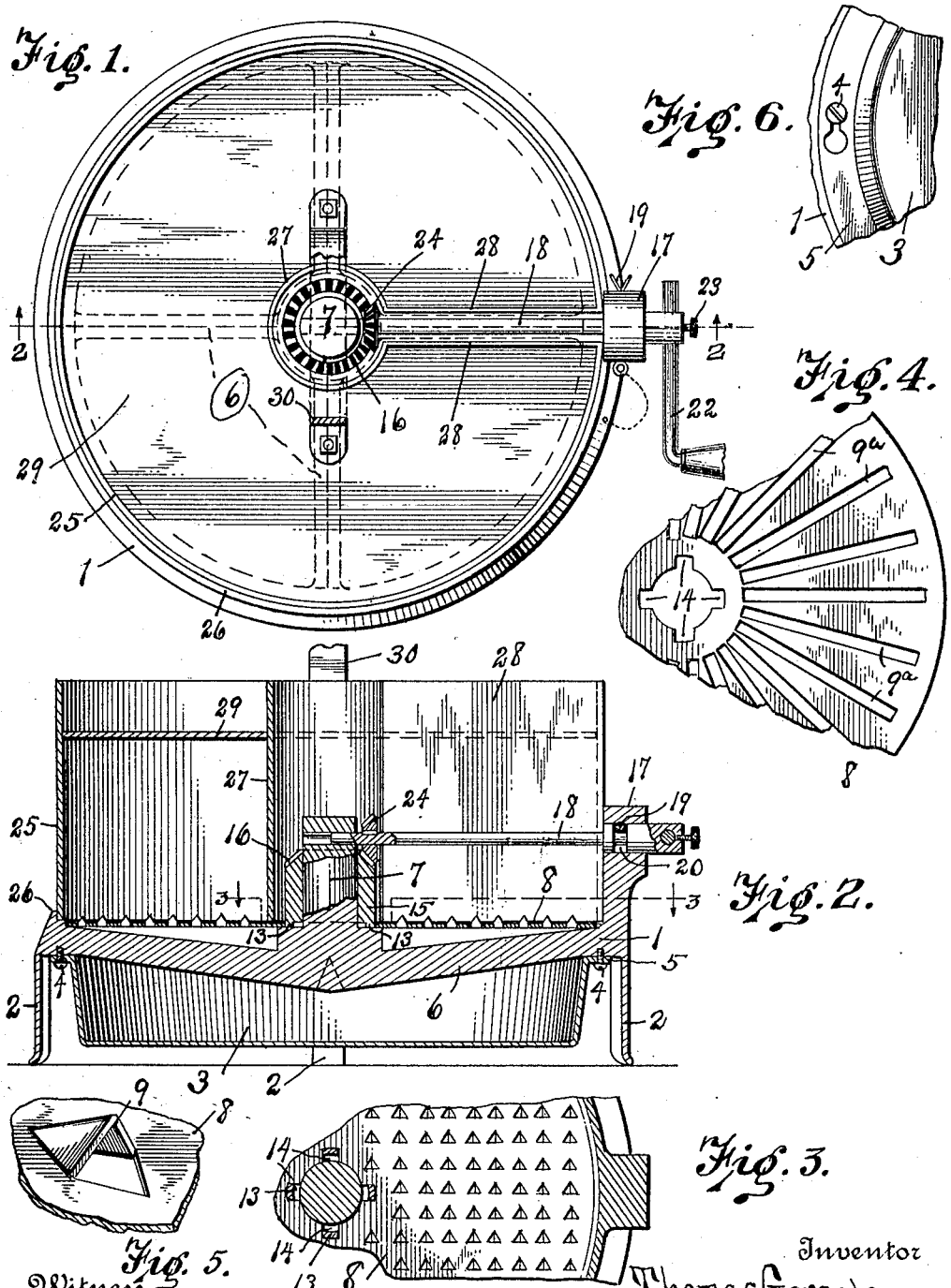

THOMAS GORZELANY, OF DETROIT, MICHIGAN.

GRATER AND SLICER.

1,308,668.     Specification of Letters Patent.     Patented July 1, 1919.

Application filed April 11, 1919. Serial No. 289,404.

*To all whom it may concern:*

Be it known that I, THOMAS GORZELANY, a citizen of the Republic of Poland, and residing at Detroit, in the county of Wayne and State of Michigan, have invented a new and Improved Grater and Slicer, of which the following is a specification.

This invention relates to means for finely dividing vegetable and other relatively soft substances, and its object is to provide a device which can be easily and quickly changed from a grater to a slicer, which can be readily taken apart for cleaning, and which can be constructed at low cost.

This invention consists of a base having a central guide pin and a cutter plate rotatable on the base, a gear connected to the cutter plate and mounted on the central guide pin, a pinion engaging the gear, means to drive the pinion, and a receptacle mounted on the base for the material to be divided. It further consists in forming this receptacle with a separate compartment into which extends the driving mechanism for the cutter plate so that the material being divided will not come into contact with the driving mechanism. It also consists in the details of construction illustrated in the accompanying drawing and particularly pointed out in the claims.

In the accompanying drawing, Figure 1 is a plan of this improved machine with the handle of the presser-plate broken away to show the gears. Fig. 2 is a section on the line 2—2 of Fig. 1. Fig. 3 is a section on the line 3—3 of Fig. 2. Fig. 4 is a plan of a part of a slicer plate. Fig. 5 is a detail of a grater tooth. Fig. 6 is a detail of the pan that receives the divided material.

Similar reference characters refer to like parts throughout the several views.

The base 1 of this device is preferably circular and supported on legs 2. A receptacle 3 in the form of a shallow pan may be mounted beneath the base on screws or pins 4 which extend through key-hole slots in the rim 5 of the pan 3, as shown in Fig. 6. This renders this receptacle easily removable. The base is formed with radial bars 6, shown in dotted lines in Fig. 1, which carry a central guide pin 7.

A cutter plate 8 having cutting teeth 9 or knives 9ª of any desired form is rotatable on the base which is preferably formed with a slight depression in which this plate is centered. These teeth or knives are preferably punched up from the plate and if this is made of tool-steel the plate may be quite thin and the teeth or knives will then usually require no sharpening. The central opening in this cutter is formed with extensions 14 into which the fingers 13 on the hub 15 of the driving gear 16 may extend. This gear is rotatable on the central guide pin 7.

The base is formed with a pedestal 17 which constitutes one bearing for the driving shaft 18. A pin 19, preferably a split cotter, extends through this pedestal and across the groove 20 in this shaft to prevent it from moving in and out. A handle 22 extends through a transverse hole in the outer end of this shaft and may be held in the desired position by means of a screw 23.

The inner end of the shaft is journaled in a hole in the central guide pin 7 and onto it is secured a bevel pinion 24 which meshes with the gear 16. A container 25, preferably of sheet metal, fits within a flange 26 on the base and is formed with an inner receptacle or inclosure composed of a cylindrical wall 27 and two parallel walls 28. The driving gears and shaft extend up into this inner inclosure which prevents any of the material being divided from getting in between the teeth of the gears.

A presser plate 29 is provided with a central opening and a radial slot and fits within the container 25 and around the walls 27 and 28. A handle 30 connects to this plate and is of sufficient height to permit the plate to go to the bottom of the container 25. When the material to be divided has been placed in the container 25, the plate 29 is pressed down thereon until all the material has been grated or sliced.

The details and proportions of this device may all be changed without departing from the spirit of my invention as set forth in the following claims.

I claim:—

1. The combination of a base having a central post, a cutter plate and a gear connected thereto both rotatable on said post, a shaft and a pinion to turn the gear and plate, and a container above the plate to hold materials to be divided, said container being formed with an inner chamber to receive the shaft and gears to prevent the materials to be divided from getting into the driving mechanism.

2. The combination of a base comprising a ring and cross arms supporting a central post, a cutter plate and a bevel gear rotatably mounted on the post, a driving shaft journaled at its inner end in said post and having a handle on its outer end and a bevel pinion on its inner end, said pinion meshing with said gear, a pedestal and bearing for said shaft extending up from said ring outside of said cutter plate, a container for the materials to be divided resting on the base, and a slidable presser plate adapted to be forced down within the container to hold said materials against the cutter plate.

3. The combination of a base comprising a ring and cross arms supporting a central post, a cutter plate and a bevel gear rotatably mounted on the post, a driving shaft extending from said post and having a handle on its outer end and a bevel pinion on its inner end, said pinion meshing with said gear, a container for the materials to be divided resting on the base, and a slidable presser plate adapted to be forced down within the container to hold said materials against the cutter plate, said container being formed with an inner chamber to receive the shaft and gears to prevent said materials from getting into the driving mechanism, said presser plate having a slot to permit the passage of the walls of said inner chamber.

THO'S GORZELANY.

Copies of this patent may be obtained for five cents each, by addressing the "Commissioner of Patents, Washington, D. C."